United States Patent Office 3,496,859
Patented Feb. 24, 1970

3,496,859
REDUCTION OF CAN CORROSION AND PRODUCT DETERIORATION OF HIGH ACID IN-CAN FOOD PRODUCTS
Bryant R. Dunshee, St. Paul, and Joseph W. Opie and Steven R. Speech, Minneapolis, Minn., assignors to General Mills, Inc., a corporation of Delaware
No Drawing. Filed Sept. 11, 1967, Ser. No. 666,925
Int. Cl. A23b 7/00
U.S. Cl. 99—182                                            7 Claims

ABSTRACT OF THE DISCLOSURE

Reduction of interaction between metal containers and high acid food products and aid in preservation of the flavor and color of said food products by the use of an edible liquid, water miscible alcohol.

Our invention consists of a method for controlling the interaction of high acid food products on metal containers. We have discovered that by including a liquid phase containing an edible liquid, water miscible alcohol in high acid food products we can inhibit flavor and color deterioration and can corrosion.

By high acid foods, we mean generally those below a pH of about 3.7 and generally below a pH of 3.

We have found that by practicing the teachings of our invention certain flavoring and coloring materials noted for their perishability are preserved in a metal can for periods longer than thought possible in a high acid environment.

Although the concept of our invention is particularly applicable to high acid liquid foods such as cranberry, lemon and lime juices, partial substitution of brine or syrup in foods such as pickles, sauerkraut, some members of the berry family and pineapple are also contemplated.

Normal imperfections eixst in the tin coating of cans. Scratches or internal damage can cause small areas of iron to be exposed. When the tin and iron are in contact with a substrate with a high acid content, an electrocouple is formed. The corrosion is more complicated than that of tin or iron alone. The principal factor influencing the corrosion of tinplate is the polarity of the metal in the couple. The polarity is governed by the presence of an oxide film on the metal surfaces and the ability of the electrolyte to remove the tin ions as a complex. When the oxide film is dissolved, if the electrolyte contains anions such as citrate or oxalate (with which tin forms a stable complex), tin becomes anodic and the attack is confined to the tin surface, while the iron base is protected. If the stable complex is not formed, tin remains cathodic and the iron is attacked and perforated.

Oxygen depolarizes and therefore is important in the corrosion process. Hydrogen gas should be evolved when displaced by the action of acid on the metal. This action is very slow at the tin surface unless oxygen or some other depolarizer is present. If hydrogen is not evolved it exerts a back pressure so to speak, and thus opposes further solution of the iron. The rate of attack is slow in the absence of oxygen. Anthocyanin pigments of fruits may act as depolarizers. Red fruits are prone to perforate cans.

Lacquered cans may be more easily perforated than plain tin cans, due to the fact that areas of exposed iron are not aflorded cathodic protection or the protection of dissolved tin. Imperfections in the lacquered surface tend to concentrate this chemical activity to small areas, and perforation may be rapidly accomplished.

A so-called epoxy lacquer for cans used in high acid foods has been the most common solution to ingredient interaction with can metal. These coatings are expensive, however, and subject to the coating imperfections described above. Morecver, epoxy has been found to be a temporary preventative under certain conditions, and color changes and off flavors may develop in some high acid products after a period under two months. This is thought to be the result of the presence of heavy metal salts that are produced from small amounts of said corrosion and these salts have deleterious effects on flavoring and coloring compounds.

Packaging in glass has been used for high acid foods but is impractical for a high acid beverage mix in cases where the flavors and coloring material present in a beverage mix are easily injured by light catalyzed reactions. Tinted glass, while better than clear glass, has not proven to be an adequate preventive for these photochemical and light catalyzed reactions. Furthermore, metal closures of glass bottles and their rubber seals are subject to attack by the acid present.

The teachings of our invention provide a method of inhibition of the interaction resulting from canning high acid foods. We have found that by the substitution of the aqueous fractions of food products by an edible liquid, water miscible alcohol, we can prevent can-product interaction and retard deterioration of the product flavor and color for substantial periods of time. We are also able to inhibit can corrosion due to the prevention or retardation of the interaction described above.

The preferred embodiments of our invention concern products of the high acid type which have either propylene glycol, glycerine or a combination of the two as part of the liquid portion of the food. Both of these alcohols may be substituted for water with ease. Propylene glycol has a slight acrid taste which may be masked to some extent by other flavoring components, notably sugar. Glycerine has a slightly sweet taste which may be desirable in certain products, although propylene glycol is generally preferred over glycerol from a cost standpoint.

This invention is particularly useful in the beverage mix area. When the liquid beverage mix is sufficiently concentrated so that many drinks could be made from very small amounts of liquid, the pH may be so low that the product tends to corrode metal containers after minimal periods of storage. In order to achieve the degree of concentration necessary for this type of product the pH of the mix must be generally below 3.5 and preferably between 2 and 3.

By the teachings of our invention we are able to produce a high acid liquid drink mix with a sufficient water to mix ratio to make the product fully desirable from a consumer standpoint, while minimizing the possibility of interaction between container and product, i.e., we can achieve a water to mix ratio that would enable us to produce a 6-oz. mix capable of making up to almost one hundred 6-oz. drinks.

A level above 50% of propylene glycol and/or glycerine by weight of the liquid phase is needed to produce a subjectively noticeable effect for very high acid foods. However, lower levels of alcohols are of value in the inhibition of can-product interaction. We have found generally that a range of about 75 to about 100% is the most desirable with levels nearest 100% performing the best.

We have found that glycerol and propylene glycol are most useful as a mix base when the water to mix ratio is extremely high. If the water to mix ratio is below about 40:1, i.e., 1 aliquot of concentrate will produce 40 aliquots of finished drink, the characteristic taste of glycerine and proplyene glycol is somewhat evident by the other ingredients when used at the levels preferred. A maximum water to mix ratio for the drink mix is about 100:1. At levels above this figure the components usually found in beverages of this type are no longer soluble and the mix becomes extremely viscous. We particularly prefer a water to mix ratio of about 60:1 to above 90:1.

The beverage mix may contain flavoring, coloring and sweetening. However, if the concentrated beverage is designed so that it is sweetened in the can, artificial sweeteners will be required because of the tremendous difference in sweetness per unit weight between sugar and the artifical sweeteners and the bulk required by the use of sugar. If the drink is not presweetened the consumer may add the amount and type of sweetener desired.

Various alcohols without defined class may be combined in the mix to produce similar results. We are not sure of the reason for these alcohols reducing the product-can interaction in a high acid environment. We think that there may be a reduction of activity of hydrogen ions by the alcohols or some weak physical bonding between the alcohols and the $H^+$ ions, although we do not intend to be limited to any theory.

Examples of the concept of our invention follow and are directed particularly towards the new type of product made possible by our disclosure. The high acid drink mixes are used as examples because of the graphic illustration provided by the very high acid concentration necessary for the production of this concentrated type of beverage. Obviously foods with lower acid concentration but with low pH are capable of benefiting from the teachings illustrated below. We have chosen to use a water to mix ratio of 100:1 because of its extremely low pH.

EXAMPLE I

The ingredients used for Example I are given below—

Ingredient: Percent by weight
Citric acid, anhydrous _____ 18.400
*Liquid grape flavor [1] _____ 24.100
Calcium cyclamate _____ 8.900
Sodium saccharin _____ 0.562
F. D. & C. color _____ 0.306
Glycerol, water or propylene glycol _____ Balance

[1] This flavoring component contains 35% water.

The mixes were placed in identical pressurized cans with a valve release with high acid resistant coatings and sealed with a valve under reduced pressure. They were then pressurized with nitrogen at 90 p.s.i. for 30 seconds.

A subjective rating scale was used to evaluate can corrosion and flavor and color deterioration after 9 weeks of storage. The criteria for the scale and the results of the tests are as follows:

TABLE I

|  | Flavor | Color | Corrosion |
|---|---|---|---|
| Water base, 100° F | 3-2 | 3 | 5 |
| Propylene glycol base, 100° F | 4 | 5-4 | 5 |
| Water base, 40° F | 3 | 4 | 5 |
| Propylene glycol base 40° F | 5 | 5 | 5 |
| Water base, room temperature | 3 | 4 | 5 |
| Propylene glycol base, room temperature | 4 | 5 | 5 |

KEY
5—no color loss, no flavor loss, no corrosion
4—3—some color loss, some flavor loss, 5-10% surface corrosion
2—1—extensive color loss, extensive flavor loss, total surface corrosion The data from Example I indicates the effect of extended periods of storage on a water based sample.

EXAMPLE II

Example I was repeated except that 12.0% by weight of a grape flavor having twice the strength of the grape flavor of the preceding example with only 17% of the 12% by weight as water. This meant that the amount of propylene glycol was increased to 97% by weight of the solvent phase. Storage tests were done for four weeks. The table below indicates that even for this short period of time a subjective difference in flavor and color was noticeable due to the very high concentration of propylene glycol.

TABLE II

|  | Flavor | Color | Corrosion |
|---|---|---|---|
| Water base, 100° F | 4 | 4 | 5 |
| Propylene base, 100° F | 5 | 5 | 5 |
| Water base, 40° F | 5-4 | 5 | 5 |
| Propylene glycol base, 40° F | 5 | 5 | 5 |
| Water base, room temperature | 4 | 4 | 5 |
| Propylene glycol base, room temperature | 5 | 5 | 5 |

KEY
5—no color loss, no flavor loss, no corrosion
4—3—some color loss, some flavor loss, 5-10% surface corrosion
2—1—extensive color loss, extensive flavor loss, total surface corrosion

EXAMPLE III

The results of the presence of propylene glycol are most graphically illustrated by the data in this example. The formula and procedure for this Example were identical to Example II with the only difference being the use of unlined cans in this example. An analysis was run as before in this two week test on color and corrosion using the 5 point scale of Examples I and II for can corrosion and product color. An additional sample of the aerosol was made up with 80% propylene glycol by weight in the solvent phase. The amount of propylene glycol was lessened for this sample and replaced with water. This Example illustrates the fact that the higher the level of propylene glycol the greater the inhibition of can-product interaction.

TABLE III

|  | 4 days | | 1 week | | 2 weeks | |
|---|---|---|---|---|---|---|
|  | Corrosion | Color | Corrosion | Color | Corrosion | Color |
| Water base, 100° F | 3 | 4 | 1 | 1-2 | 1 | 1 |
| 97% propylene glycol, 100° F | 4 | 5 | 3 | 3 | 2 | 1-2 |
| 80% propylene glycol, 100° F | 3 | 5 | 2 | 3 | 1 | 1 |
| Water base, 40° F | 3 | 4-5 | 1 | 2-3 | 1 | 1 |
| 97% propylene glycol, 40° F | 4 | 5 | 4 | 4 | 3 | 2 |
| 80% propylene glycol, 40° F | 3 | 5 | 2 | 4 | 1-2 | 1-2 |
| Water base, room temperature | 3 | 4 | 1 | 2 | 1 | 1 |
| 97% propylene glycol, room temperature | 4 | 5 | 3 | 4-3 | 2 | 2 |
| 80% propylene glycol, room temperature | 3 | 5 | 2 | 4-3 | 1 | 1 |

As previously mentioned the product of our invention should in no way be construed to be limited to drink mixes or for that matter fruit flavored drink mixes. Drink mixes were chosen as illustrative of the product of our invention because these systems have only flavoring and coloring materials and acid (plus artificial sweeteners if desired). It is more easily demonstrable in this type of system that the inhibition of can-product interaction as due to the presence of the edible alcohols defined previously.

As mentioned previously any level of alcohol is contemplated up to and including 100% of the solvent phase. There is no difficulty in reaching this level technically but practically water is the base for most flavoring components. If an alcohol similar to those described herein is used as the medium for the flavors the 100% level is possible.

Having fully and completely disclosed our invention, we hereby claim:

1. A packaged food product comprising a food product of the high acid type having a pH below 3.7 and containing an edible liquid, water miscible alcohol, said food product being in a metallic can and said alcohol being present in levels high enough to inhibit can-product interaction.

2. The product of claim 1 where the food is a soft liquid drink mix comprised of an edible acid and edible liquid, water miscible alcohol, said mix having a water-to-mix ratio between about 40:1 and 100:1 and said alcohol present at a level greater than about 50% by weight of the solvent phase.

3. The product of claim 2 where the alcohol is present at a level between about 75 to 100% by weight of the solvent phase.

4. The product of claim 2 where the alcohol is chosen from a class consisting of glycerol and propylene glycol.

5. The product of claim 2 where the mix contains a flavoring material.

6. The product of claim 2 where the mix contains a coloring material.

7. The product of claim 2 where the mix contains an artificial sweetening material.

References Cited

UNITED STATES PATENTS 3,087,822  4/1963  Smith _____ 99—105 X
3,425,841  2/1969  Handwerk _____ 99—105

FRANK W. LUTTER, Primary Examiner

U.S. Cl. X.R.

99—186

PO-1050
(5/69)

UNITED STATES PATENT OFFICE
CERTIFICATE OF CORRECTION

Patent No. 3,496,859      Dated February 24, 1970

Inventor(s) Bryant R. Dunshee, Joseph W. Opie and Steven R. Speech

It is certified that error appears in the above-identified patent and that said Letters Patent are hereby corrected as shown below:

Column 2, line 8, "said" should read --acid--;
Column 3, line 3, "above" should read --about--; line 12, "without" should read --within our--.

SIGNED AND
SEALED
SEP 15 1970

(SEAL)
Attest:

Edward M. Fletcher, Jr.
Attesting Officer

WILLIAM E. SCHUYLER, JR.
Commissioner of Patents